US007730176B1

(12) United States Patent
Ishikawa et al.

(10) Patent No.: US 7,730,176 B1
(45) Date of Patent: Jun. 1, 2010

(54) IDENTIFICATION AND TRACKING OF DIGITAL CONTENT DISTRIBUTORS ON WIDE AREA NETWORKS

(75) Inventors: Mark M. Ishikawa, Los Gatos, CA (US); Travis Hill, Provo, UT (US)

(73) Assignee: BayTSP.com, Inc., Los Gatos, CA (US)

( * ) Notice: Subject to any disclaimer, the term of this patent is extended or adjusted under 35 U.S.C. 154(b) by 1135 days.

(21) Appl. No.: 10/845,436

(22) Filed: May 12, 2004

(51) Int. Cl.
*G06F 15/173* (2006.01)
*G06F 15/16* (2006.01)

(52) U.S. Cl. ...................................... 709/224; 709/217

(58) Field of Classification Search ................. 709/217, 709/224, 231
See application file for complete search history.

(56) References Cited

U.S. PATENT DOCUMENTS

| | | | | |
|---|---|---|---|---|
| 5,265,164 | A | * | 11/1993 | Matyas et al. .................. 380/30 |
| 2002/0073204 | A1 | * | 6/2002 | Dutta et al. .................. 709/227 |
| 2002/0152261 | A1 | * | 10/2002 | Arkin et al. .................. 709/202 |
| 2003/0028896 | A1 | * | 2/2003 | Swart et al. .................. 725/127 |
| 2003/0233455 | A1 | * | 12/2003 | Leber et al. .................. 709/226 |
| 2006/0031381 | A1 | * | 2/2006 | Van Luijt et al. ............ 709/217 |

OTHER PUBLICATIONS

Mccrary, Ken, "The Gnutella file-sharing network and Java", Oct. 6, 2000, JavaWorld.com, http://www.javaworld.com/javaworld/jw-10-2000/jw-1006-fileshare.html.*
Ivkovic, Igor, "Improving Gnutella Protocol: Protocol Analysis and Research Proposals", 2001, http://www.cs.cornell.edu/People/egs/615/gnutella.pdf.*
Shiels, Maggie, "Cyver sleuths hunt file-swappers" Jul. 29, 2003, BBC News, "http://news.bbc.co.uk/1/3104281.stm".*

* cited by examiner

*Primary Examiner*—Larry Donaghue
*Assistant Examiner*—Brian J Gillis
(74) *Attorney, Agent, or Firm*—Osama Hussain, Esq.

(57) ABSTRACT

A system and method for tracking and identifying digital content distributors using file sharing networks. The system monitors distribution networks, logs pertinent network and distributor information, generates network statistics, gathers evidence of content distribution, and notifies interested parties of the availability of content on file sharing networks.

28 Claims, 6 Drawing Sheets

IDENTIFICATION AND TRACKING OF DIGITAL CONTENT DISTRIBUTORS ON WIDE AREA NETWORKS

BACKGROUND

1. Field

The present disclosure relates to digital content distribution, and in particular to the identification and tracking of digital content distributors on Wide Area Networks.

2. Related Art

Distribution of copyrighted digital content on the Internet and other Wide Area Networks (WANs) is a growing problem. Identification of digital content distributors is attempted on an ad hoc basis, for example by manually searching for a file representing a piece of copyrighted content on a file sharing network and making a note of user names and IP addresses of potential distributors advertising the file. Such approaches are inefficient and not scalable. Accordingly, is a need for an efficient and automated system for identification and tracking of digital content distributors on WANs.

SUMMARY

A system and method for tracking and identifying digital content distributors on Wide Area Networks. The system monitors distribution networks, logs pertinent network and distributor information, generates network statistics, gathers evidence of content distribution, and notifies interested parties of the availability of content on Wide Area Networks. In addition, the system optionally disrupts digital content distribution by utilizing the acknowledgement mechanism of the TCP/IP protocol.

DETAILED DESCRIPTION

The following serves as a glossary of terms as used herein:

Digital content—A digital representation of an image, video, audio, text, software or other data.

Wide Area Network (WAN)—A network of communicating nodes, wherein some of the nodes are geographically dispersed, such as covering a distance between buildings, cities or countries.

File sharing network—A network of nodes communicating according to a protocol allowing the sharing of digital content among the nodes.

File sharing network client application—An application for connecting to a file sharing network and sharing digital content over the file sharing network.

Single-source download—A download of a piece of digital content, wherein the downloaded fragments of the piece originate from a single source node, for example from a single IP address.

Multi-source download—A download of a piece of digital content, wherein the downloaded fragments of the piece originate from a plurality of source nodes, for example from a plurality of IP addresses.

External file hash—A hash value associated with a file, wherein the hash value is assigned by a distribution network (such as a file sharing network) and made available as a search key for the file.

Internal file hash—A hash value associated internally (by the present disclosure) with a file in the primary database, the hash value serving as a fingerprint for identifying similar or duplicate digital content.

Figure 1:
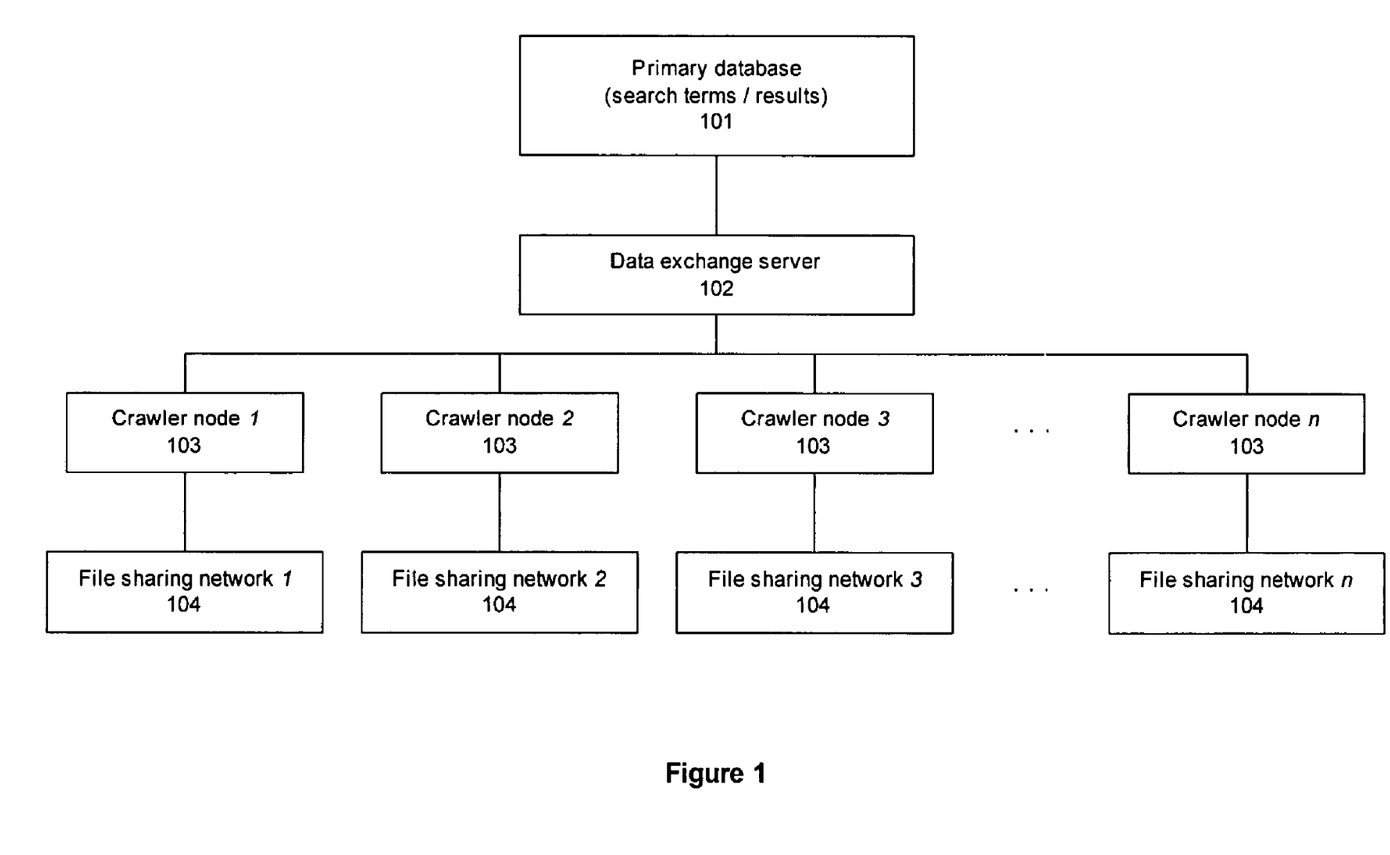
FIG. 1 is a block diagram showing a system for identification and tracking of digital content distributors, comprising a primary database 101, a data exchange server 102, and one or more crawler nodes 103, according to an embodiment of the present disclosure.

FIG. 1 is a block diagram showing a system for identification and tracking of digital content distributors, comprising a primary database 101, a data exchange server 102, and one or more crawler nodes 103, according to an embodiment of the present disclosure. A crawler node 103 establishes a connection to a Wide Area Network according to a distribution protocol, such as a file sharing network protocol, an IRC (Internet Relay Chat) protocol, a spidering protocol and/or any other content distribution protocol, and initiates a search for a piece of digital content based on one or more search terms. By way of example and not by limitation, the Figures depict crawlers 103 establishing connections to file sharing networks 104 via an appropriate file sharing protocol on a Wide Area Network; however it is understood that other distribution protocols on a Wide Area Network (as recited above) can be used analogously. If a node in file sharing network 104 reports an availability of the sought piece of digital content, crawler node 103 logs such availability and optionally initiates a single-source or a multi-source download of the piece of digital content from the file sharing network 104. The primary database 101 stores search terms for the crawler 103 searches, as well as any search results obtained from crawler node 103. The data exchange server 102 acts as an interface between primary database 101 and crawler nodes 103, retrieving search terms from primary database 101 and providing them to crawler 103, as well as receiving search results from crawler node 103 and storing them in primary database 101. Any two crawler nodes 103 may establish connections with the same file sharing network 104 or with different file sharing networks 104.

Figure 2:
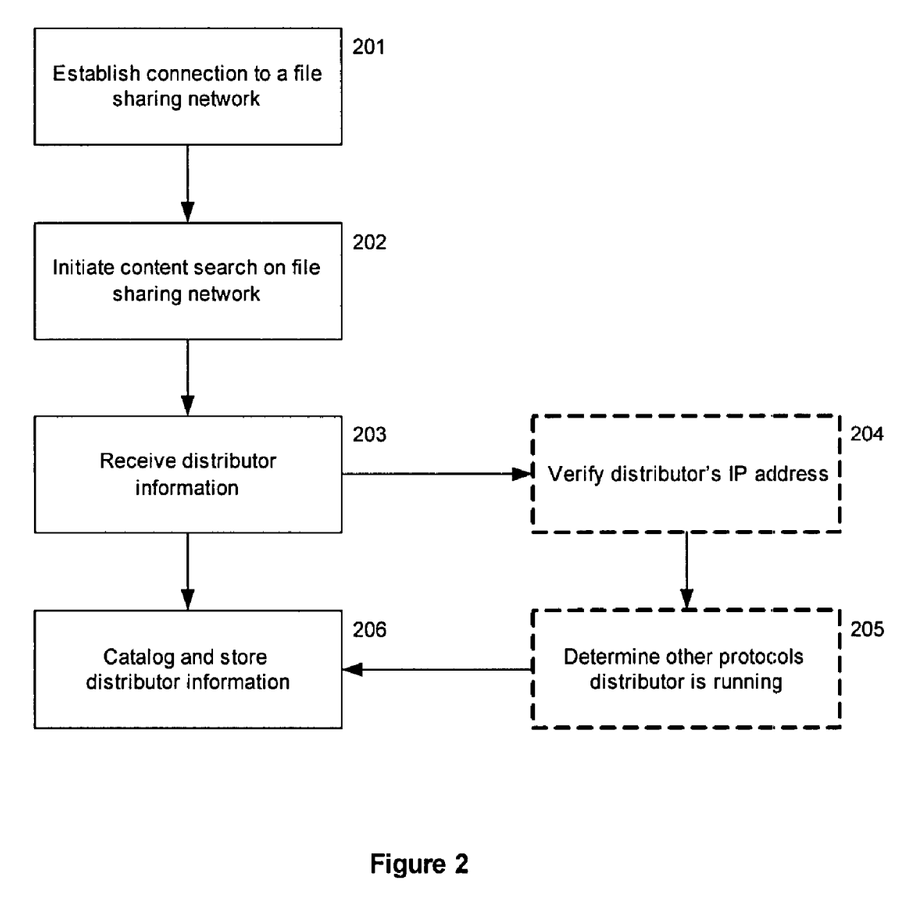
FIG. 2 is a flow diagram showing a method for identification and tracking of digital content distributors, according to an embodiment of the present disclosure.

FIG. 2 is a flow diagram showing a method for identification and tracking of digital content distributors, according to an embodiment of the present disclosure. A crawler node 103 establishes 201 a connection to a file sharing network 104 and initiates 202 a search for a piece of digital content, the search comprising one or more search keywords obtained from primary database 101 via data exchange server 102. Crawler node 103 receives 203 a search result from the file sharing network, the search result indicating one or more distributors (hereinafter also known as suspected distributors) and respective pieces of digital content distributed by the one or more suspected distributors. As an example, such search result comprises an IP address of a suspected distributor, a port number as used by a suspected distributor, a file name, a file size, an external file hash and/or other identifiers which the file sharing network makes available regarding a piece of digital content made available by a suspected distributor, and/or other data about any digital content and suspected distributors. Optionally, verify 204 IP addresses (if obtained) of any suspected distributors. Optionally, determine 205 what other file sharing protocols (if any) are used by such suspected distributors. Finally, log 206 any received and/or verified information about such suspected distributors and digital content, and relay the information to data exchange server 102 for storage in primary database 101. Optionally, perform preliminary filtering on the gathered information prior to sending to data exchange server 102, for example by discarding information pertaining to files whose file names indicate a different content type than the content type under search (e.g. a .AVI video file when we are looking for something like an audio file), or by discarding information pertaining to files that do not match all submitted keywords. Optionally, crawler node 103 also requests statistical information from file sharing network 104, such as the number of users currently using the file sharing network 104, the set of files available on the file sharing network 104, the number of files available on the file sharing network 104, a list of the different versions of any sought piece of digital content available on the file sharing network 104, and/or any other statistical information about file sharing network 104. If available and supplied by the file sharing network 104, crawler node 103 stores such statistical information in primary server 101.

Figure 3:
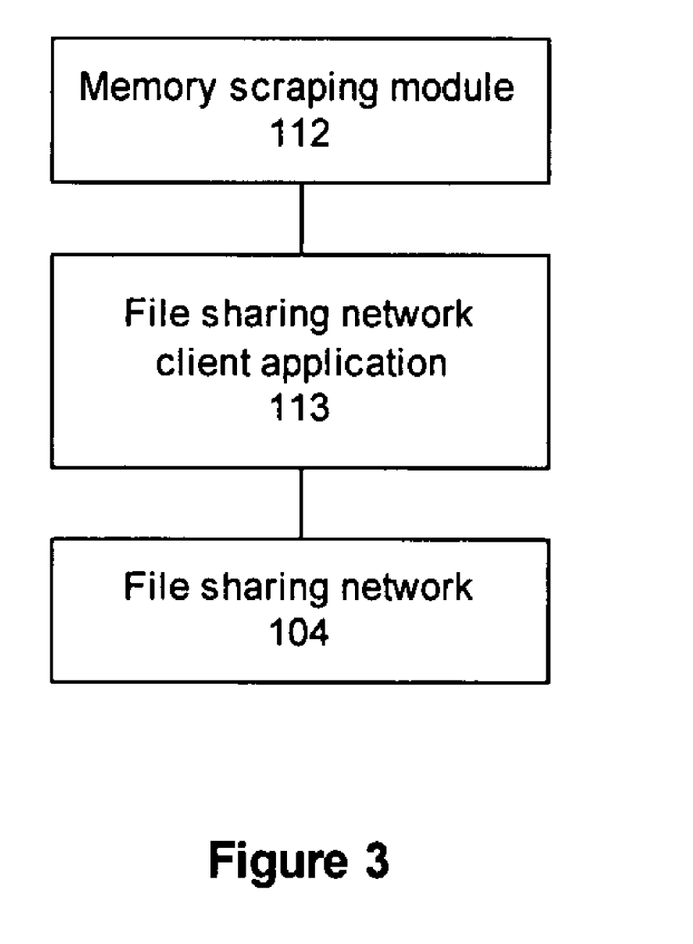
FIG. 3 is a diagram illustrating a memory scraping module 112, according to an embodiment of the present disclosure.

It may be the case that a file sharing network 104 discloses information about peers (such as IP address, or other information described above) in such as way that the disclosed information is decipherable only by a native client application 113 of the file sharing network 104. This may be accomplished for example by encrypting such information in transit, and having the native client application 113 decrypt the information when needed to make a connection to the respective peers. In such a case, an optional embodiment of the present disclosure launches a native client application 113 of the file sharing network 104, and retrieves such information by performing "memory scraping", wherein memory allocation and memory usage of the client application 113 is monitored. FIG. 3 is a diagram illustrating a memory scraping module 112, according to an embodiment of the present disclosure. With initial user assistance, memory scraping module 112 deduces a pattern in the memory usage of the file sharing network 104 client application 113. A user interacts with the file sharing network client application 113 as the user would normally when seeking out a file, comprising performing a search, examining the search results, and selecting a file for download. At the same time, the memory scraping module 112 monitors changes occurring in memory and deduces the pattern of memory usage for future automated parsing. Once such a pattern is known and stored, memory scraping module 112 applies the pattern to search requests submitted by the file sharing network 104 client application 113 and/or to search results returned to the file sharing network 104 client application 113, and decodes information about distributors, such as IP address, port number, file name, file size, external file hash and/or other identifiers. The information is then parsed into a format suitable for storage into primary database 101.

Figure 4:
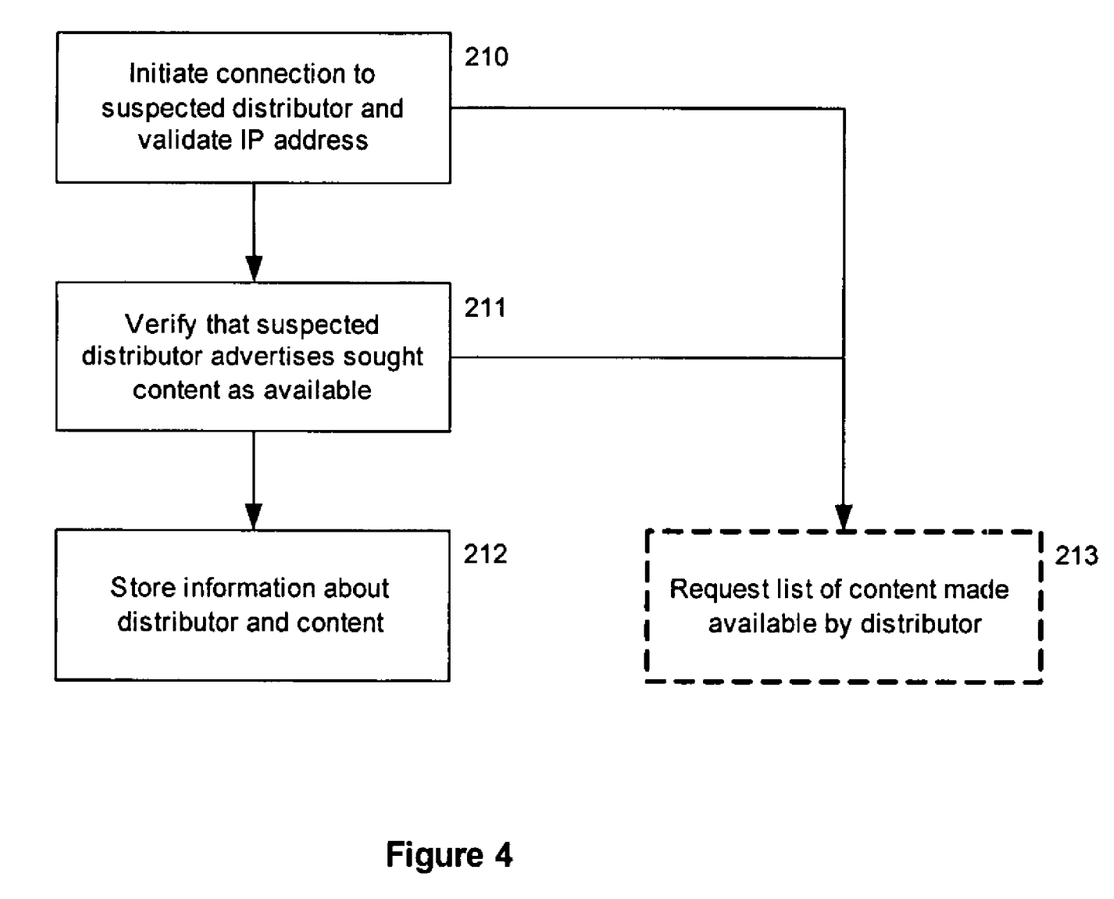
FIG. 4 is a flow diagram showing a method for identification and tracking of digital content distributors, according to an embodiment of the present disclosure.

FIG. 4 is a flow diagram showing a method for identification and tracking of digital content distributors, according to an embodiment of the present disclosure. After searching for information about suspected distributors of a given piece of digital content, and receiving such, information from a file sharing network 104, initiate 210 a connection to such a suspected distributor, for example by using an IP address, port number and/or content distribution protocol in use by the suspected distributor, wherein such information was obtained and logged as described above. Successful establishment of a connection with the suspected distributor's obtained IP address in effect validates the suspected distributor's IP address, and an "assurance score" is set to indicate that an obtained IP address of the suspected distributor was successfully validated. The assurance score comprises a combination of (1) the number of connection attempts and (2) the amount of time passed before a connection is successfully established to the IP address. The assurance score is associated with the suspected distributor and stored in the primary database 101. Next, attempt to verify 211 that the suspected distributor indeed uses the content distribution protocol and makes available the piece of digital content. The verification step 211 uses obtained information about the piece of digital content such as a file name, file size, file format and/or any other obtained or previously known attribute of the digital content. Results of the verification step 211, indicating whether the suspected distributor does advertise the digital content of interest as available or not, are stored 212 in the primary database 101. Optionally, validation of a suspected distributor's IP address is automatically scheduled to be performed immediately, or at a later time, following the identification of a suspected distributor.

Optionally, after step 210 or 211, issue 213 a request for a list of content made available by the suspected distributor in order to obtain information (such as file name, file size, file format and/or other content identifiers and/or content attributes used by file sharing network 104) about digital content offered by the suspected distributor. Such data, if obtained, is stored 212 in primary database 101 for later use.

Once a piece of digital content is suspected to have become available for download over a file sharing network, an attempt is made to confirm this suspicion by (a) initiating a multi-source download of the piece of digital content, or by (b) initiating a single-source download of the piece of digital content.

Figure 5A:
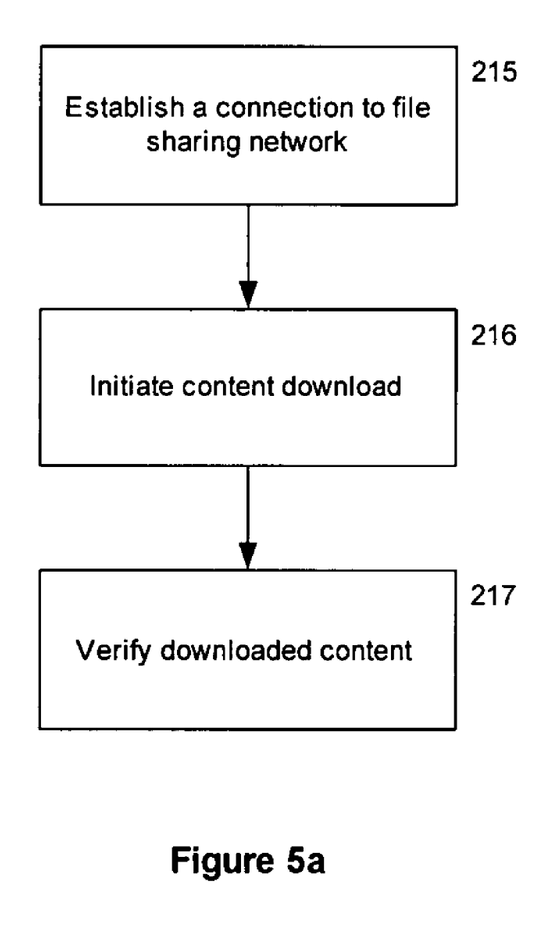
FIG. 5a is a flow diagram illustrating a method for performing a multi-source download of a piece of digital content, according to an embodiment of the present disclosure.

FIG. 5a is a flow diagram illustrating a method for performing a multi-source download of a piece of digital content, according to an embodiment of the present disclosure. Establish 215 a connection to file sharing network 104, and initiate 216 a download of the piece of digital content, wherein the file sharing network 104 dynamically arranges download sources for the piece of digital content, and wherein possibly different segments of the piece of digital content are obtained from different download sources. Once content is successfully downloaded, verify 217 that the downloaded content indeed represents the sought piece of digital content. An example of verification step 217 comprises rendering the downloaded content (for example by playing a downloaded video clip or audio clip, or by displaying a downloaded image or document on a viewing screen) and using a human to verify that the downloaded content matches the sought content. Optionally, an internal hash value is computed for the downloaded content, allowing efficient determination of whether the content already exists in primary database 101 and therefore is a duplicate that can be discarded. As another option, the content type may be determined by examining a header of the downloaded content. Note that whereas a successful multi-source download of a piece of sought digital content confirms the suspicion that the content is available over a file sharing network 104, such a multi-source download does not necessarily identify any one person (or entity or IP address) as a distributor of the entire piece of digital content. Optionally, only a portion of the sought digital content is downloaded using multi-source download, establishing that such a portion of the sought content is made available by the file sharing network 104. Optionally, a multi-source download of sought digital content is automatically scheduled to be performed immediately, or at a later time, following the confirmation that a file sharing network 104 advertises availability of such content.

Figure 5B:
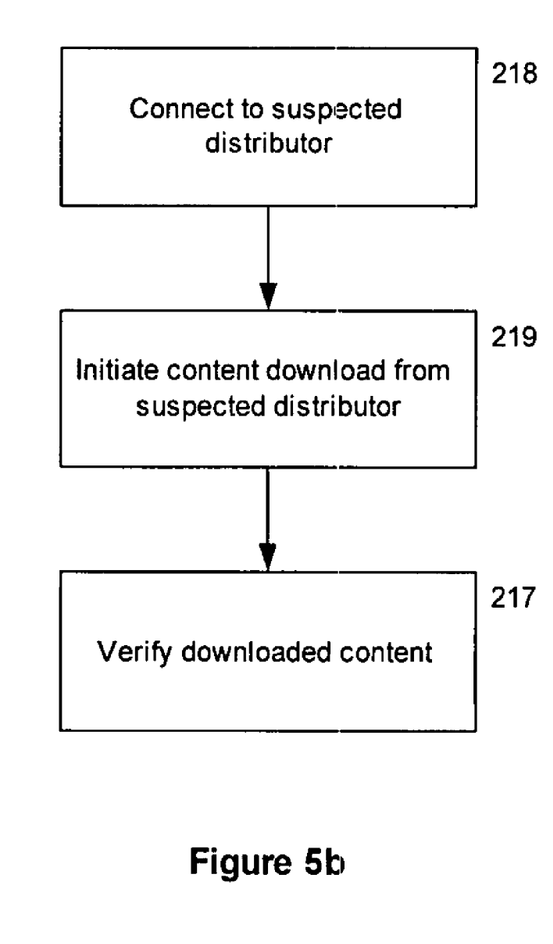
FIG. 5b is a flow diagram illustrating a method for performing a single-source download of a piece of digital content, according to an embodiment of the present disclosure.

FIG. 5*b* is a flow diagram illustrating a method for performing a single-source download of a piece of digital content, according to an embodiment of the present disclosure. Establish 218 a connection to a specific suspected distributor, and initiate 218 a download of the piece of digital content from the suspected distributor. Once content is successfully downloaded, verify 219 that the downloaded content indeed represents the sought piece of digital content. An example of verification step 219 comprises rendering the downloaded content (for example by playing a downloaded video clip or audio clip, or by displaying a downloaded image or document on a viewing screen) and using a human to verify that the downloaded content matches the sought content. Note that in addition to confirming the suspicion that the digital content is available over a file sharing network 104, a single-source download also identifies one person (or entity or IP address) as a distributor of the entire piece of digital content. Optionally, only a portion of the sought digital content is downloaded using single-source download, establishing that such a portion of the sought content is made available by the distributor. Optionally, a single-source download of sought digital content is automatically scheduled to be performed immediately, or at a later time, following the confirmation that a distributor advertises availability of such content from an IP address.

It is an advantageous aspect of the present disclosure that the several different crawler nodes 103 can have several different connections to several different file sharing networks 104, web sites (via spidering), IRC nodes and/or other distribution nodes simultaneously. Optionally, an alert message is issued upon determining that a designated piece of digital content is found to be advertised as available on any one of the file sharing networks 104 to which one or more of the crawler nodes 103 are connected. The alert functionality enables a user to dynamically create and/or edit a "watch list" comprising one or more pieces of digital content, wherein an alert is issued if any piece of digital content on the watch list is suspected to be available on a file sharing network 104.

Figure 6:
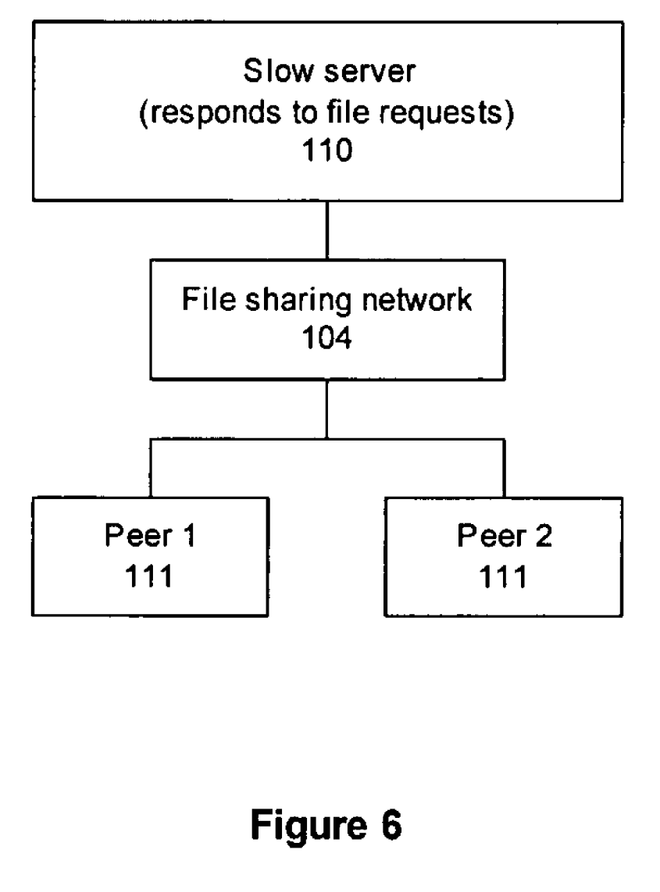
FIG. 6 is a diagram showing a "slow server" 110 emulating a file sharing network 104 client application 113, according to an embodiment of the present disclosure.

In addition to identifying and tracking suspected content distributors, the present disclosure optionally emulates a file sharing network 104 client application 113 on a file sharing network 104 by executing a native file sharing client application 113 appropriate for the file sharing network 104. FIG. 6 is a diagram showing a "slow server" 110 emulating a file sharing network 104 client application 113, according to an embodiment of the present disclosure. The slow server 110 attempts to serve file requests from peers 111 on the file sharing network 104, with the exception that the service is interrupted at the Operating System level by intercepting TCP/IP packets transmitted to and/or from the emulated native client application 113 in order to drop and/or ignore every p packets by not sending an acknowledgement back to the requesting peer 111, thereby causing the TCP stack to fall into "slow packet mode". The number p is tunable and may be initially set for example to drop one out of every three packets, such that enough packets are ignored and/or unacknowledged in order to disrupt content transmission while still responding to system packets and/or status packets in order to have the connection appear intact to requesting peers 111. This arrangement makes it difficult for a peer 111 requesting digital content to obtain the content from the file sharing network 104.

In an alternative embodiment of the present disclosure, distributors participating in an IP telephony protocol are targeted. Crawler node 103 initiates a connection with an IP telephony network (which may be part of a file sharing network 104), searches for any users and/or peers who advertise their presence in an IP telephony directory, and stores any information provided by the IP telephony network and/or file sharing network 104 about such users into primary database 101, analogous to above description for other protocols on Wide Area Networks.

The foregoing described embodiments are provided as illustrations and descriptions. They are not intended to limit the disclosure to precise form described. In particular, it is contemplated that functional implementation of the embodiments described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of disclosure not be limited by this Detailed Description, but rather by claims following.

We claim:

1. A method for identifying a digital content distributor on a file sharing network, comprising:

establishing one or more connections to a wide area network through one or more crawler nodes, the file sharing network accessible through the wide area network;

utilizing a data exchange server to transmit one or more search keywords to the one or more crawler nodes, the one or more search keywords stored in a primary database, the primary database coupled to the data exchange server, the data exchange server coupled to the one or more crawler nodes;

submitting a search request through one or more crawler nodes to a file sharing network, the search request comprising the one or more search keywords;

receiving one or more identifiers from the file sharing network, the one or more identifiers indicating a suspected distributor of a piece of digital content, the piece of digital content comprising a result of the search request, the one or more identifiers comprising an IP address of the suspected distributor;

requesting one or more descriptive data, the one or more descriptive data to generally characterize the piece of digital content;

performing preliminary filtering on the one or more descriptive data to determine accuracy of search request results;

if the search request results are accurate, sending one or more identifiers to the data exchange server; and storing the one or more identifiers for a validation of the IP address of the suspected distributor in the primary database, whereby the validation effectively confirms that the suspected distributor makes the piece of digital content available on the file sharing network via the validated IP address without downloading the piece of digital content;

automatically initiating a multi-source download of a portion of the piece of digital content from the file sharing network by scheduling the multi-source download to begin at a predetermined time following confirmation that the file sharing network advertises availability of the piece of digital content, whereby a completion of the multi-source download effectively confirms an availability of the portion of the piece of digital content on the file sharing network; and examining a result of the multi-source download for confirming that a downloaded content matches a content description disclosed by the suspected distributor.

2. The method of claim 1, wherein the validation of the IP address of the suspected distributor comprises:
connecting to the IP address of the suspected distributor; and
verifying (a) that the suspected distributor uses a file sharing protocol according to the file sharing network, and (b) that the piece of digital content is available for download from the IP address of the suspected distributor.

3. The method of claim 1, wherein the one or more identifiers further comprise a port number of the suspected distributor.

4. The method of claim 1, wherein the one or more identifiers further comprise a name or a size of a file, the file comprising the piece of digital content.

5. The method of claim 1, wherein the piece of digital content comprises a digital video clip, a digital audio clip, or a digital image.

6. The method of claim 1, further comprising generating an alert, the alert indicating an availability of the piece of digital content on the file sharing network.

7. The method of claim 1, further comprising requesting statistical data from the file sharing network, the statistical data comprising (a) a number of users on the file sharing network, or (b) a number of files available on the file sharing network.

8. The method of claim 1, further comprising initiating a single-source download of a portion of the piece of digital content from the suspected distributor, whereby a completion of the single-source download effectively confirms a distribution of the portion of the piece of digital content by the suspected distributor.

9. The method of claim 8, further comprising examining a result of the single-source download for confirming that a downloaded content matches a content description disclosed by the suspected distributor.

10. The method of claim 1, further comprising requesting a list of one or more files available for download from the suspected distributor via the file sharing network.

11. The method of claim 10, wherein an element of the list of one or more files comprises a file name, a file size and a file format.

12. The method of claim 1, wherein said scheduling the multi-source download comprises scheduling the multi-source download to begin immediately following confirmation that the file sharing network advertises availability of the piece of digital content.

13. A method for identifying a digital content distributor on a file sharing network, comprising:
establishing one or more connections to a wide area network through one or more crawler nodes, the file sharing network accessible through the wide area network:
utilizing a data exchange server to transmit one or more search keywords to the one or more crawler nodes, the one or more search keywords stored in a primary database, the primary database coupled to the data exchange server, the data exchange server coupled to the one or more crawler nodes;
submitting a search request through one or more crawler nodes to a file sharing network, the search request comprising one or more file hash values;
receiving one or more identifiers from the file sharing network, the one or more identifiers indicating a suspected distributor of a piece of digital content, the piece of digital content comprising a result of the search request, the one or more identifiers comprising an IP address of the suspected distributor;
requesting one or more descriptive data, the one or more descriptive data to generally characterize the piece of digital content;
performing preliminary filtering on the one or more descriptive data to determine accuracy of search request results;
if the search request results are accurate
sending one or more identifiers to the data exchange server; and
storing the one or more identifiers for a validation of the IP address of the suspected distributor in the primary database, whereby the validation effectively confirms that the suspected distributor makes the piece of digital content available on the file sharing network via the validated IP address without downloading the piece of digital content;
automatically initiating a multi-source download of a portion of the piece of digital content from the file sharing network by scheduling the multi-source download to begin at a predetermined time following confirmation that the file sharing network advertises availability of the piece of digital content, whereby a completion of the multi-source download effectively confirms an availability of the portion of the piece of digital content on the file sharing network; and
examining a result of the multi-source download for confirming that a downloaded content matches a content description disclosed by the suspected distributor.

14. The method of claim 13, wherein the validation of the IP address of the suspected distributor comprises:
connecting to the IP address of the suspected distributor; and
verifying (a) that the suspected distributor uses a file sharing protocol according to the file sharing network, and (b) that the piece of digital content is available for download from the IP address of the suspected distributor.

15. The method of claim 13, wherein the one or more identifiers further comprise a port number of the suspected distributor.

16. The method of claim 13, wherein the one or more identifiers further comprise a name or a size of a file, the file comprising the piece of digital content.

17. The method of claim 13, wherein the piece of digital content comprises a digital video clip, a digital audio clip, or a digital image.

18. The method of claim 13, further comprising generating an alert, the alert indicating an availability of the piece of digital content on the file sharing network.

19. The method of claim 13, further comprising requesting statistical data from the file sharing network, the statistical data comprising (a) a number of users on the file sharing network, or (b) a number of files available on the file sharing network.

20. The method of claim 13, further comprising initiating a single-source download of a portion of the piece of digital content from the suspected distributor, whereby a completion of the single-source download effectively confirms a distribution of the portion of the piece of digital content by the suspected distributor.

21. The method of claim 20, further comprising examining a result of the single-source download for confirming that a downloaded content matches a content description disclosed by the suspected distributor.

22. The method of claim 13, further comprising requesting a list of one or more files available for download from the suspected distributor via the file sharing network.

23. The method of claim 22, wherein an element of the list of one or more files comprises a file name, a file size and a file format.

24. The method of claim 13, wherein said automatically initiating the multi-source download includes automatically initiating the multi-source download from the file sharing network that dynamically arranges download sources for the piece of digital content.

25. The method of claim 24, wherein said automatically initiating the multi-source download includes automatically initiating the multi-source download from the file sharing network that permits different segments of the piece of digital content to be obtained from different download sources.

26. The method of claim 13, wherein said scheduling the multi-source download comprises scheduling the multi-source download to begin immediately following confirmation that the file sharing network advertises availability of the piece of digital content.

27. A computer program product for identifying a digital content distributor on a file sharing network, the computer program product being encoded on more or more machine-readable storage media and comprising:
   instruction for establishing one or more connections to a wide area network through one or more crawler nodes, the file sharing network accessible through the wide area network;
   instruction for utilizing a data exchange server to transmit one or more search keywords to the one or more crawler nodes, the one or more search keywords stored in a primary database, the primary database coupled to the data exchange server, the data exchange server coupled to the one or more crawler nodes;
   instruction for submitting a search request through one or more crawler nodes to a file sharing network, the search request comprising the one or more search keywords;
   instruction for receiving one or more identifiers from the file sharing network, the one or more identifiers indicating a suspected distributor of a piece of digital content, the piece of digital content comprising a result of the search request, the one or more identifiers comprising an IP address of the suspected distributor;
   instruction for requesting one or more descriptive data, the one or more descriptive data to generally characterize the piece of digital content;
   instruction for performing preliminary filtering on the one or more descriptive data to determine accuracy of search request results;
   instruction for, if the search request results are accurate,
      sending one or more identifiers to the data exchange server; and
      storing the one or more identifiers for a validation of the IP address of the suspected distributor in the primary database, whereby the validation effectively confirms that the suspected distributor makes the piece of digital content available on the file sharing network via the validated IP address without downloading the piece of digital content;
   instruction for automatically initiating a multi-source download of a portion of the piece of digital content from the file sharing network by scheduling the multi-source download to begin at a predetermined time following confirmation that the file sharing network advertises availability of the piece of digital content, whereby a completion of the multi-source download effectively confirms an availability of the portion of the piece of digital content on the file sharing network; and
   instruction for examining a result of the multi-source download for confirming that a downloaded content matches a content description disclosed by the suspected distributor.

28. The computer program of claim 27, wherein said instruction for automatically initiating the multi-source download includes scheduling the multi-source download to begin immediately following confirmation that the file sharing network advertises availability of the piece of digital content.

* * * * *